United States Patent [19]

Hashimoto

[11] Patent Number: 4,653,961
[45] Date of Patent: Mar. 31, 1987

[54] MOBILE PIPE CONVEYOR SYSTEM AND METHOD OF USING SAID SYSTEM FOR RECLAIMING AND LEVELING GROUNDS

[75] Inventor: Kunio Hashimoto, Kitakyushu, Japan

[73] Assignee: Japan Pipe Conveyor Co., Ltd., Fukuoka, Japan

[21] Appl. No.: 732,085

[22] Filed: May 9, 1985

[30] Foreign Application Priority Data

Jul. 31, 1984 [JP] Japan .................. 59-161033

[51] Int. Cl.⁴ .................................................. E02D 1/00
[52] U.S. Cl. ............................ 405/258; 198/300; 405/303; 405/117
[58] Field of Search ............ 405/258, 217, 303; 198/312, 304, 303

[56] References Cited

U.S. PATENT DOCUMENTS

| | | | |
|---|---|---|---|
| 1,760,616 | 5/1930 | Whitcomb | 405/117 X |
| 1,980,634 | 11/1934 | Philips | 405/117 |
| 2,040,022 | 5/1936 | Philips | 405/117 |
| 2,879,884 | 3/1959 | Joy | 198/304 X |
| 3,863,752 | 2/1975 | Sibley | 198/303 |
| 3,887,061 | 6/1975 | Hopkins | 198/304 |
| 4,206,840 | 6/1980 | Hanson | 198/304 X |
| 4,489,818 | 12/1984 | Franke et al. | 198/303 X |

FOREIGN PATENT DOCUMENTS 1455658 11/1976 United Kingdom ............... 198/303

Primary Examiner—Dennis L. Taylor
Attorney, Agent, or Firm—Zarley McKee, Thomte, Voorhees & Sease

[57] ABSTRACT

A mobile pipe conveyor system which is capable of bending smoothly and freely both in horizontal and vertical within a certain range to be moved and/or laid in zigzag without dropping transported materials in contrast to the conventional flat-belt conveyor, and a method for reclaiming and leveling grounds utilizing said mobile pipe conveyor system arranged between a swiveling conveyor and a base point inside or outside of a land to be reclaimed, the entire pipe conveyor system together with the swiveling conveyor being pulled by one or more bulldozers and easily moved about the base point without adjusting 1/e zigzag movement and/or laying, so that reclaiming and leveling works on a large scale can be completed in a short time.

3 Claims, 8 Drawing Figures

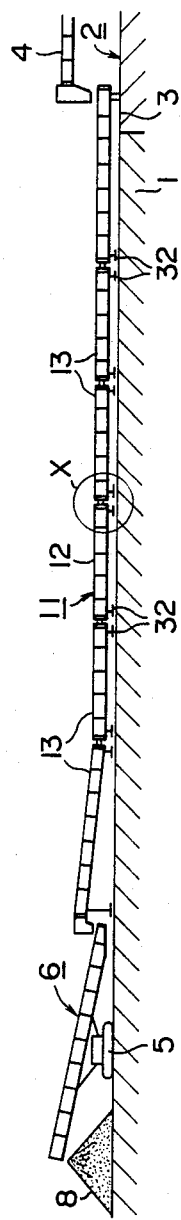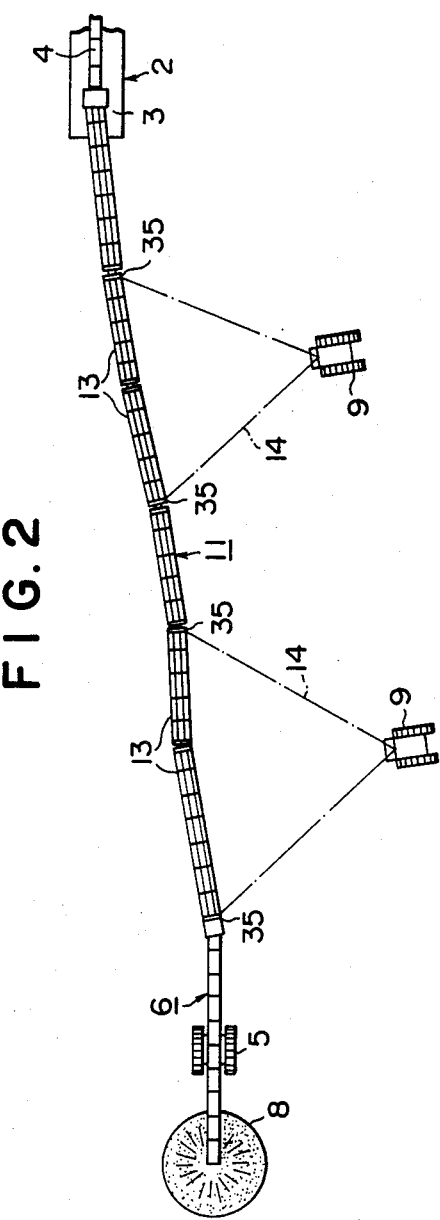

MOBILE PIPE CONVEYOR SYSTEM AND METHOD OF USING SAID SYSTEM FOR RECLAIMING AND LEVELING GROUNDS

BACKGROUND OF THE INVENTION

1. Field of the Invention

This invention relates to a mobile pipe conveyor system particularly adapted to be used in efficiently reclaiming an extensive area with earth and sands and leveling the ground, and also relates to a method of using said system for reclaiming and leveling works.

2. Description of the Prior Art

Reclaiming work for a small area can be carried out by transporting earth and sands by dump-trucks and leveling by bulldozers. However, it would take very long time and a huge amount of transportation cost to apply this method of reclaiming work to an extensive area.

Therefore, in general, reclaiming works on a large scale have been performed by the steps of arranging a forwardly ascending swiveling conveyor at the front end of flat-belt conveyors, throwing up a number of mounds of earth and sands in arcuate below the front end of the flat-belt conveyors, leveling them by bulldozers, and repeating the above steps for the whole reclaiming area.

In reclaiming a vast area by this conventional method, while the work can be carried out without any particular difficulty for part of the area in the extending direction of the flat-belt conveyors, since operational range of the swiveling conveyor is limited, it is often necessary to move the flat-belt conveyors in its lateral directions in order to reclaim parts of the area at a right-angled direction to the flat-belt conveyors.

In the movement of the flat-belt conveyors in the lateral directions, it is necessary to repeat a process many times for the entire length of the conveyors, said process comprising the steps of partially lifting the conveyors at some height, bending the conveyors not forcibly to some extent, and moving the conveyors little by little in the lateral direction. Furthermore, it is also necessary to adjust to prevent the flat-belt conveyors from running in zigzag. As described in the above, the lateral movement of the conveyors is always an annoying work and takes much time.

SUMMARY OF THE INVENTION

This invention provides a conveyor system and a method of using the system, in which arranging a mobile pipe conveyor between the flat-belt conveyors and the swiveling conveyor, the mobile pipe conveyor comprising a plurality of divided frame members from a long frame connected in a row with each other by universal joints, and easily swiveling the pipe conveyor about its base end in use of the characteristic of the pipe conveyor being movable in zigzag, thereby remarkably expanding the operational range of the swiveling conveyor, intending the system and the method of the invention to be utilized for reclaiming and leveling a vast area with the above flat-belt conveyors or its replacing pipe conveyors arranged in stationary.

According to the present invention, since the pipe conveyor, differing from the flat-belt conveyors, can be moved and/or laid in zigzag, and transported materials would not drop from the pipe conveyor even when being set in zigzag, the swiveling conveyor can be easily moved in a wider range by a bulldozer for leveling work or other vehicles pulling the mobile pipe conveyor to swivel it about the base end, so that reclaiming and leveling works on a large scale can be completed in a short time.

BRIEF DESCRIPTION OF THE DRAWINGS

FIG. 1 is a side view of the mobile pipe conveyor system of the present invention, explanatorily showing the reclaiming and leveling method of using the system.

FIG. 2 is a plan view of the system in FIG. 1.

DESCRIPTION OF THE PREFERRED EMBODIMENT

In FIG. 1 to FIG. 5, the mobile pipe conveyor system and the reclaiming and leveling method of using the system are shown.

Figure 3:
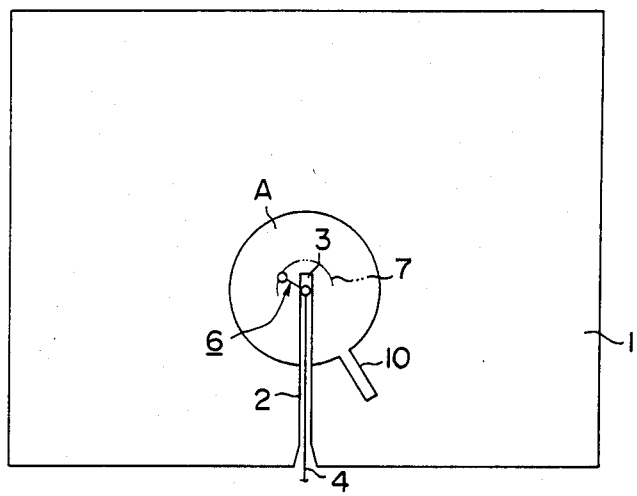
FIG. 3 is a plan view showing a condition of the reclaiming work just started.

In case of a reclaiming work on a large scale, as shown in FIG. 3, an access road 2 is temporarily constructed in a vast reclamation land 1 extending from the middle of one side of the land to the center of the land, at the forward end of which is provided with a base point 3, and a stationary conveyor 4 of a pipe conveyor or a flat-belt conveyor is constructed, transporting some amount of earth and sands to the base point 3 to reclaim and level the ground around the base point.

Then, the forward end of the stationary conveyor 4 is connected with the base end of a self-traveling swiveling conveyor 6 of a pipe conveyor or a flat-belt conveyor, which is mounted onto a tractor 5, now shown in FIG. 3, to be adjustable of its inclination.

Then, mounds of earth and sands 8, not shown in FIG. 3, are constructed on a semi-circular line 7 for dropping as illustrated by a dotted line with earth and sands transported through the stationary conveyor 4 and the swiveling conveyor 6 and by swiveling the swiveling conveyor 6, and while reclaiming the area A and leveling by a bulldozer 9, not shown in FIG. 3, a first auxiliary access road 10 is temporarily constructed extending for a certain length to a radial direction from a certain point in the area A.

In the next, as shown in FIGS. 1 and 2, the route of conveyance of earth and sands is extended by self-traveling the swiveling conveyor 6 which is now disconnected from the stationary conveyor 4 in use of the first auxiliary access road 10, and by arranging a first mobile pipe conveyor 11 between the forward end of the stationary conveyor 4 and the base point of the swiveling conveyor 6 so as to freely swivel about the forward end of the stationary conveyor 4. The first mobile pipe conveyor 11, the frame 12 of which is constructed with a plurality of longitudinally divided frame members as described hereinafter, can be moved in zigzag.

With earth and sands transported through the stationary conveyor 4, the first mobile pipe conveyor 11 and the swiveling conveyor 6, the area B around the forward end of the first auxiliary access road 10 is reclaimed and leveled in the same manner as described in the above.

Figure 4:
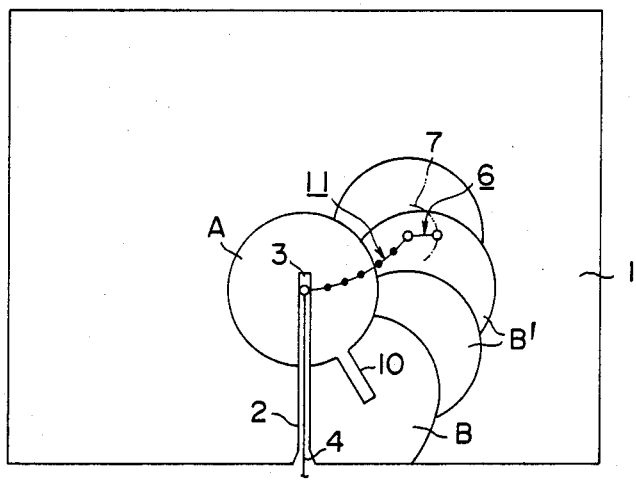
FIG. 4 is a plan view showing a condition of the reclaiming work being proceeded.

Then, as shown in FIG. 2, the first mobile pipe conveyor 11 is pulled by the bulldozer 9 used in the above leveling work in use of the already filled areas A and B, so that the first mobile pipe conveyor 11 is moved counterclockwise about the forward end of the stationary conveyor 4 in FIG. 4, and the swiveling conveyor 6 is travelled by itself to connect the forward end of the first mobile pipe conveyor 11.

The numerical reference 14 in FIG. 2 indicates a wire rope to be used for the above pulling.

As shown in FIG. 4, the adjacent areas B' to the area B are successively reclaimed and leveled in the same manner as described in the above.

After completing reclamation of the area 1 substantially in a circle equally distant from the base point 3 by repeating the above works, a second auxiliary access road 15 is temporarily constructed to extend in the radial direction within one of the areas B' adjacent to the end of the circle.

Figure 5:
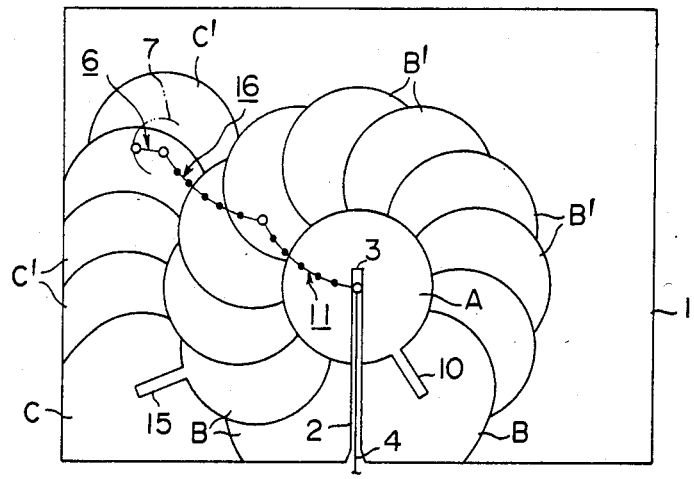
FIG. 5 is a plan view showing a condition of the reclaiming further proceeded.

Then, as shown in FIG. 5, the areas C and C' at the substantially equal distance from the base point 3 can be reclaimed and leveled successively in the same manner as in the above by providing a second mobile pipe conveyor 16 of the same type as the first mobile pipe conveyor 11 between the first mobile pipe conveyor 11 and the swiveling conveyor 6 to further extend the conveying route for earth and sands.

In case of the land to be reclaimed being longitudinally narrow, the base point 3 can be provided in the middle of the longer side of the reclaiming land 1 without constructing the access road 2, so that the mobile pipe conveyors 11, 16 can be arranged to extend therefrom in the same manner as in the above. In case of the land 1 to be reclaimed being laterally very long, a number of base points 3 may be provided along the longer side of the land.

Figure 6:
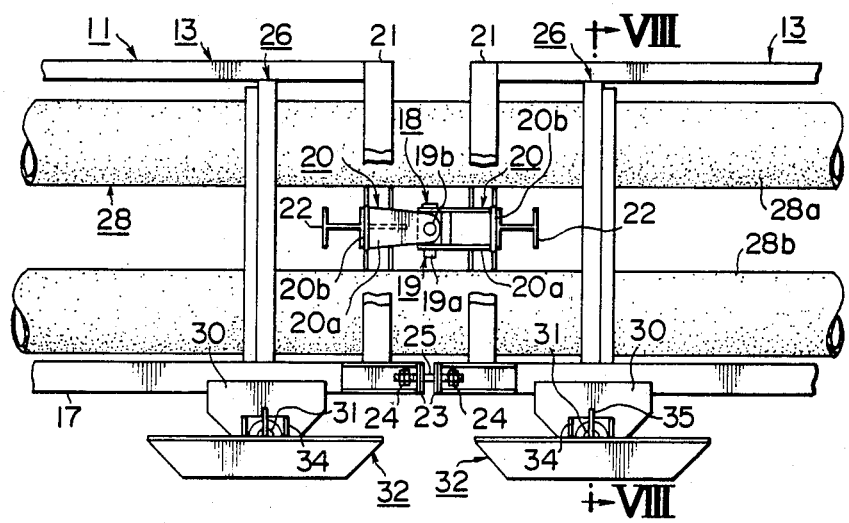
FIG. 6 is an enlarged side view of the circled part with an indication X in FIG. 1.
Figure 7:
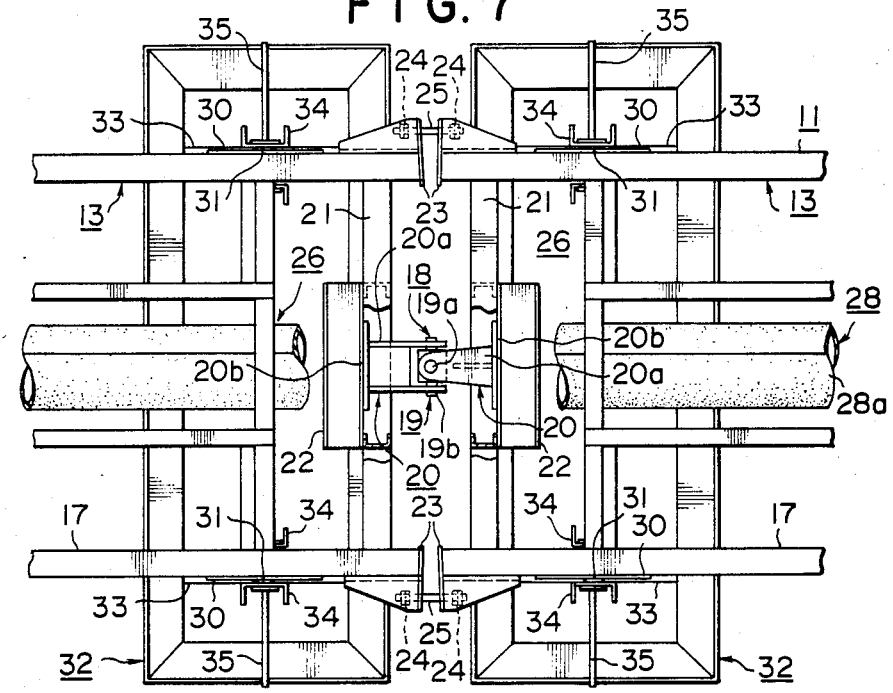
FIG. 7 is a plan view of the same in FIG. 6.
Figure 8:
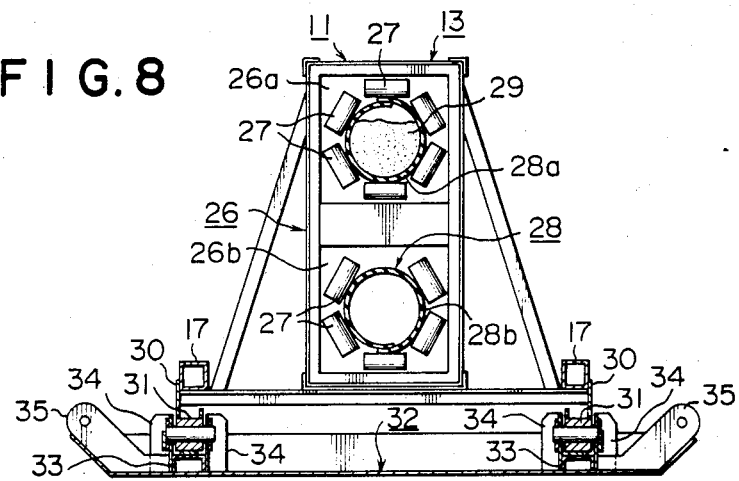
FIG. 8 is a longitudinal cross-sectional view of the same at line VIII—VIII in FIG. 6.

In FIGS. 6 to 8, the principal parts of the first mobile pipe conveyor 11 is illustrated. Each divided frame member 13 is mounted onto an oblong horizontal frame 17 having a very wider width than the frame members 13, both ends of which are projecting from both ends of the divided frames 13, the horizontal frame 17 being connected with each other by universal joints 18 as described below.

The universal joint 18 comprises a substantially cross-shaped connecting metal fitting 19 having a vertical rod 19a and a horizontal rod 19b, being provided with U-shaped connecting metal fittings 20 formed in the same shape and size, top ends of the parallel parts 20a of the fittings 20 being pivoted at both ends of the rods respectively, the central member 20b of each connecting metal fitting 20 being fixed through a setting frame 22 to the middle part of the oblong frame 21 standing at both ends of each horizontal frame 17.

Both side ends of the facing surfaces of each horizontal frame 17 are provided with stoppers 23 facing with each other in the longitudinal direction, the surface of each stopper being part of a plane including the center of the universal joint 18. A limiting bolt 25 is provided to pass through between the adjacent facing stoppers 23, both ends of the bolt being screwed with nuts 24.

Therefore, the adjacent horizontal frames 17 as well as the divided frames 13 can be bent within a limit determined by the limiting bolt 25 on the outer side of the bend until the facing stoppers 23 are engaged with each other.

The reference 26 indicates a holding frame at the end of the divided frame 13. The holding frame 26 is defined, as shown in FIG. 8, into an upper and a lower rooms 26a, 26b, in both rooms being provided with a plurality of holding rollers 27 pivoted on a same circumference as if forming a circle therewith. The metal supports for the roller 27 are not shown in the drawings.

The holding frames 26 are mounted in parallel each other to the divided frame 13 at a regular intervals, and the conveying belt 28a and the returning belt 28b are guided respectively by the holding rollers 27 in the upper and lower rooms 26a and 26b to transport earth and sands 29.

Laterally facing rollers 31 are pivotally mounted through setting plates 30 to the lower surface of each horizontal frame 17 adjacent to the facing ends.

The numerical reference 32 indicates a laterally long dish-shaped sledge, on the upper surface of which adjacent to both lateral ends is provided with a channel-like beam member 33 fixedly mounted in the longitudinal direction thereon, in the middle of both side walls of the beam member 33 are fixed with U-shaped metal guides 34, and the outer ends of the guides 34 are attached with projecting tow plates 35.

Each divided frame 13 is supported by the sledge with the rollers 31 being guided by the metal guides 34 to ride on the center of the upper surface of the beam member 33.

Accordingly, as shown in FIG. 2, by fastening the wire rope 14 to the desired tow plates 35 and pulling by the bulldozer 9 for leveling work, the mobile pipe conveyor 11 can be swiveled in the lateral direction about the base point 3 and/or about each other.

In case that the entire system of the mobile pipe conveyor 11 is bent a little, the pipe conveyor units 28 being different from a flat-belt conveyor can be bent without any trouble or difficulty even when the conveying belt 28a is filled up with earth and sands 29.

Accordingly, a series of the divided frames 13 can be bent both vertically and horizontally by the universal joints 18 as described in the above, and the lower surface of the sledge 32 is always kept grounded by rotation of the rollers 31 even if the divided frame 13 is tilted, so that the mobile pipe conveyor system can be moved smoothly.

As it has been described in the above, the mobile pipe conveyor system according to the present invention can be bent smoothly and freely in any direction at and by the universal joints connecting the divided frames, so that its movement and/or change of direction can be performed easily, and furthermore, the troublesome adjusting work of the zigzag after movement is not necessary, which is a great advantage to the flat-belt conveyor.

Also, according to the present invention, the base point and the swiveling conveyor, without moving the base point, can be connected by the mobile pipe conveyor system being extendable with requirement to transport earth and sands, so that reclaiming and leveling works on a large scale can be completed more easily within a shorter period, which is remarkably efficiently and economically.

I claim:

1. A method for reclaiming and leveling lands characterized by comprising the steps of:
   reclaiming and leveling around a base point located at a certain point either inside or outside of a land to be reclaimed, connecting a forwardly ascending swiveling conveyor to said base point,
transporting earth and sands into the operational area of said swivelng conveyor to reclaim and level said area,
connecting a mobile pipe conveyor system between said base point and the swiveling conveyor so as to rotate about the base point, said system comprising a frame being divided in longitudinal direction into a plurality of divided frame members, said frame members being connected in line with each other by universal joints, and means for limiting bend angle of said conveyor provided onto facing surfaces on both sides of the conveyor,
rotating said mobile pipe conveyor system and said swiveling conveyor about said base point, thereby extending the operational area of said swivel conveyor for reclaiming and leveling the land within said extended area.

2. A method as claimed in claim 1, characterized by further comprising constructing an access road extending into the land to be reclaimed from a certain point on its periphery to construct a stationary conveyor, in which the base point is set at the forward end of the access road.

3. A method for reclaiming and leveling lands according to claim 1, characterized by connecting additional frame members into said frame of said mobile pipe conveyor system thereby expanding the operational area of said swiveling conveyor.

* * * * *